| United States Patent [19] | [11] 3,926,954 |
|---|---|
| Kiesewetter et al. | [45] Dec. 16, 1975 |

[54] PREPARATION OF SALTS OF CARBOXYLIC ACIDS CONTAINING A BETA-LACTAM GROUP

[76] Inventors: Erwin Kiesewetter, Obere Donnerbergstr. 57; Siegfried Herrling, Auf der Liester 8, both of 519 Stolberg, Rhld., Germany

[22] Filed: May 27, 1971

[21] Appl. No.: 147,677

[52] U.S. Cl.... 260/239.1; 260/243 C; 260/306.7 C; 260/306.7 E; 424/271; 424/246
[51] Int. Cl.² ........................................ C07D 499/16
[58] Field of Search ...... 260/243 C, 306.7 C, 239.1, 260/306.7 E

[56] References Cited
UNITED STATES PATENTS

| | | | |
|---|---|---|---|
| 3,499,909 | 3/1970 | Weissenburger et al. | 260/243 C |
| 3,509,168 | 4/1970 | Christman et al. | 260/239.1 |
| 3,575,970 | 4/1971 | Weissenburger et al. | 260/243 C |
| 3,654,266 | 4/1972 | Robinson | 260/239.1 |
| 3,669,957 | 6/1972 | Robinson et al. | 260/239.1 |

*Primary Examiner*—Nicholas S. Rizzo
*Attorney, Agent, or Firm*—Weiser, Stapler & Spivak

[57] ABSTRACT

A process for the preparation of salts of carboxylic acids containing a beta-lactam group, namely penicillins, cephalosporins and 6-amino penicillanic acid. The process uses very mild conditions and the salts are obtained directly in dry form. Risk of hydrolysis or decomposition of the sensitive salts during preparation, isolation and drying of the salts is minimized by the process of the invention. The salts are obtained in good yields and high degree of purity.

29 Claims, No Drawings

PREPARATION OF SALTS OF CARBOXYLIC ACIDS CONTAINING A BETA-LACTAM GROUP

The invention concerns a process for the manufacture of salts of carboxylic acids containing a beta-lactam ring and in particular, for a process for the manufacture of pharmaceutically acceptable alkali- or alkaline earth salts of such carboxylic acids. The beta-lactam ring-containing carboxylic acids of the invention are penicillins, cephalosporins, as well as 6-aminopenicillanic acid, sometimes referred to herein as APA for convenience.

The process of the invention comprises reacting a silyl derivative of a penicillin, a cephalosporin or of 6-aminopenicillanic acid, respectively, (in which silyl derivative at least the carboxylic group of the betalactam-containing carboxylic acid is linked with the silicium atom of a silyl group derived from a trialkyl- or triaryl silanol or from a dialkyl- or diaryl silandiol), with a salt of a carboxylic acid or with a O-metal derivative of an alcohol, of a phenol, of a trialkylsilanol or of a triarylsilanol in presence of an organic aprotonic solvent which are free of water or alcohol, hereinafter referred to as anhydrous, non-hydroxylic solvent, or which contains at the most an amount of water or alcohol insufficient for desilylation of said silyl derivative.

The process of the invention is the first process for preparing a salt of any carboxylic acid, in which the carboxylic group in the starting material is not in free form or in form of a salt, but is in the form of an ester. The products obtained by the process especially the calcium salts are an embodiment of the invention.

Alkali-, and alkaline-earth, and other salts of these compounds are known. Their manufacture has taken place essentially in the following manner. A solution of the carboxylic acid containing a beta-lactam ring can be neutralized in organic or aqueous-organic solvents by means of an alkali solution, an amine, or a salt of a weak acid with the corresponding bases or metallic alcoholates, and so forth. The isolation of the salts is carried out depending on the solubility and stability of the products, by concentration of the solution, evaporation and/or filtration of the precipitated crystals, in some cases also by filtration of the products precipitated by the addition of solvents in which the desired salts are insoluble or difficultly soluble. Another known method discloses a double reaction of amine salts of carboxylic acids containing a beta-lactam ring soluble in organic solvents with metallic salts of certain fatty acids, such as those of alpha-ethylhexanoic acid, or even also with alcoholates and others in suitable solvents, such as chlorinated hydrocarbons, acetone, butyl acetate, and so on.

The first described process is especially well suited for penicillins or cephalosporins which are soluble in organic solvents as the free acids. However, it is necessary in that case, if with metallic salts of inorganic or organic acids are used, that the antibiotic used be distinctly more acid than the acid component of the salt used. Especially, the use of organic solvents containing water, frequently cause difficulties during the isolation of the salts of the antibiotics, particularly if these products are hygroscopic and/or relatively unstable as, for example, especially the salts of 6-(alpha-aminoacylamido)-penicillanic acids. With the second described process 6-(alpha-aminoacylamido)penicillanic acids also may, under certain conditions, be employed since some amine salts of these compounds (in contrast to the free penicillins, their alkali salts, and like others) are, for example, relatively readily soluble in chlorinated hydrocarbons; therefore, the products may be separated as a solid from such solutions after the reaction. But this process requires the making of the necessary amine salts, as intermediate product, and this is however, very frequently accompanied with losses of material.

By other attempts to isolate, for example, alkali salts of 6-(alpha-aminoacylamido)-penicillanic acids from their solutions, for example, by freeze-drying or by other gentle drying procedures, a relatively extensive decomposition occurs. See, for example, British Pat. No. 903,785, and the introductory part of German Pat. Disclosure No. 1,197,460. Hence, various proposals are already known for making alkali salts, especially those of alpha-aminobenzyl penicillin in such a way that alpha-aminobenzyl penicillin is converted into the salt of an organic base, as for example, of triethylamine or of diethylamine. The salt is dissolved in a chlorinated hydrocarbon, especially methylene chloride, and then the alkali salt of the alpha-aminobenzyl penicillin is precipitated from this solution by the addition of an alkali metal salt, such as of 2-ethylcaproic acid, or an alkali alcoholate, such as sodium isopropylate. Especially, the sodium salts of alpha-aminobenzyl penicillin, however, cannot be obtained in optimal purity and yield, according to the known aforesaid, multiple-step process. Losses in yield and/or impurities occur, particularly also during the manufacture of the salts.

It is to be noted that in accordance with all known process for the manufacture of salts, especially of the alkali- or earth alkaline salts of carboxylic acids containing a beta-lactam ring, the carboxyl group which is capable of the salt formation is present in the corresponding initial solution free, or bound in as an amine salt.

The process of the invention distinguishes itself fundamentally from the art in that the carboxyl group of the carboxylic acids containing the beta-lactam ring is not present in the free form nor as the salt in the initial product used for the salt formation. In contrast, the carboxyl group is present as an ester, derived from a trialkyl- or triarylsilanol, or from a dialkyl- or diarylsilandiol. The preparation of such "silyl derivatives" of carboxylic acids containing a beta-lactam ring, in which at least the carboxyl group is esterified with one of the groups named, (and which may be designated as "a silyl ester") is known.

Typical of the pertinent literature on this subject, the following may be mentioned, which are incorporated herein by reference. Concerning the manufacture of silylated penicillins, or cephalosporins from penicillins, respectively, cephalosporins, reference is made to Belgian Pat. No. 718,824, Dutch Pat. Disclosures Nos. 66.06,872, 67.13,809, 67.10,835, U.S. Pat. No. 2,746,956. Concerning the manufacture of silylated 6-aminopenicillanic acid and its conversion into silylated penicillins reference is made to Belgian Pat. Nos. 615,344, 615,401, 653,862, British Pat. Nos. 959,853, 964,449, 1,008,468, German Pat. No. 1,159,449, German Pat. Disclosures Nos. 1,800,698, 1,814,085; 1,912,904; 1,923,624; 1,931,097; 1,932,351; Dutch Pat. Disclosures Nos.: 64.01,841; 66.11,888; 68.00768, 68.18057, Swedish Pat. Disclosures No.

310,179, Swiss Pat. Disclosure Nos. 446,336, and U.S. Pat. No. 3,479,338. For the manufacture of silylated 7-aminocephalosporanic acids and their conversion into silylated cephalosporins reference is made to Belgian Pat. Disclosures Nos. 737,761, British Pat. Disclosure No. 1,073,530, Dutch Pat. Disclosure No. 67.17,107 and 68.18,868. Reference is also made to the article on PENICILLIN in The Pharmacological Basis of Theurapeutics, Goodman and Gilman (3rd Ed.); The MacMillan Company, New York, 1968, pages 1193 to 1229, especially page 1208, the chapter on Semisynthetic Penicillins, their Pharmacology and Antimicrobial Properties. All these references are incorporated herein by reference.

From the state of the art it is known that the silyl derivatives of carboxylic acids containing a betalactam ring can be hydrolyzed or alcoholyzed by water or alcohol, respectively, or other proton-active compounds with formation of the free acids. For the manufacture of salts of carboxylic acids containing a beta-lactam ring, the approach has hitherto always been to make the free carboxylic acid from the silyl esters of said acids by hydrolysis or alcoholysis, and so on, and the free carboxylic acid was then converted in a known manner (such as disclosed above) into the salts. In case the amino group is present as a salt in the silyl derivative of a 6-(aminoacylamido)-penicillanic acid, as is described in U.S. Pat. No. 3,479,338, a treatment with a base is required before or after desilylation.

Surprisingly, it has now been found that salts of carboxylic acids containing a beta-lactam ring can also be obtained from their silyl derivatives without the intermediary splitting of the silyl ester group, respectively, without the manufacture of the free acid. This object is achieved by bringing into reaction a solution of the silylated lactam ring-containing carboxylic acid in an aprotic, organic, anhydrous solvent with a solution of a salt of an organic acid, of a metal alcoholate, or of phenolates, or of a metal trialkyl- or triarylsilanolates. The solution should be anhydrous, and non-hydroxylic or merely containing such an amount of water or alcohol that is insufficient to desilylate the silyl derivative of the carboxylic acid containing a beta-lactam ring.

In accordance with the invention, there is used a silyl derivative of a carboxylic acid containing a beta-lactam ring, preferably a derivative of a 6-acylaminopenicillanic acid, especially of a compound of the structure

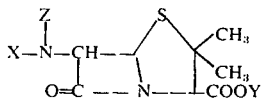

wherein X is an acyl residue, especially the residue of an alpha-phenoxyacetic-, propionic-, or butyric acid, of an alpha-amino, alpha-halogeno-, or of an alpha-alkoxyphenylacetic acid, of a 3-(or 5-)aryl-5-(or 3-)alkylisoxazolyl-4-carboxylic acid, of a 1-aminocyclohexan-1-carboxylic acid, or of 1-amino-cycloalkane carboxylic acid, the cycloalkane being of 4 to 8 carbon atoms, for instance, and further such acyl residues of acids as are known, for instance, as disclosed by Baer and Zarnack in Die Pharmazie pages 10– 14 (1970) which is incorporated herein by reference also including the residue of such as acids as used in acylating beta-lactam ring carboxylic acid, including cephalosporins, including furthermore acyl residue of alpha-aminocyclodiene acetic acid, amino-thionyl-, alpha-amino-thionyl-, alpha-aminophenyl-, alpha-(guanylureido)phenyl-, alpha-sulfonyl methyl amido-, alpha-methylene amino-, phenyl-carboxy phenyl-, alpha-carboxy thienyl acetic acids. Y is a group derived from a trialkyl- or triarylsilanol, or from a dialkyl- or diarylsilandiol and is linked with a silicium atom, and Z is a hydrogen atom or the same group as Y.

The silyl derivatives of a carboxylic acid containing a beta-lactam ring which are preferred are those in which at least the carboxyl group is linked to a group

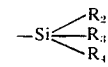

of the structure
wherein $R_2$, $R_3$, and $R_4$ are an alkyl- or an aryl residue and, preferably, are each an alkyl residue of up to 3 carbon atoms, in particular, each a methyl group, and when aryl, an aryl having 6 to 12 carbon atoms in the ring, preferably 6, like phenyl. Of the group of such silyl derivatives of carboxylic acids containing a beta-lactam ring, which are derived from a dialkyl— or diaryl-silanediol, there are preferred those which are derived from a lower dialkyl silane diol (alkyl of 1 to 6 carbons), especially from a dimethyl silane diol.

The process according to the invention, may be illustrated by the use of a trimethyl silyl ester of a carboxylic acid containing a beta-lactam ring by the following reaction (I)

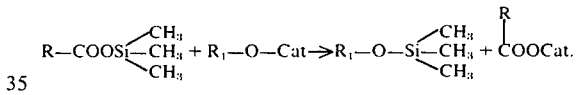

wherein R is the residue of a carboxylic acid containing a beta-lactam ring, $R_1$ is an acyl residue, an alkyl- or an aryl residue or a group of the structure

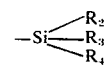

wherein $R_2$ to $R_4$ are alkyl- or aryl residues and Cat is a cation.

When in accordance with the process of the invention, there is used a silyl derivative of a 6-(aminoacylamido)-penicillanic acid with a salt-like bound amino group (compare, for example, structure I of German Pat. Disclosure, No. 1 800 698), the amino group should be converted first into the free or silylated compound before the manufacture of, for example, the alkali salt of this 6-(aminoacylamido)-penicillanic acid. This can be performed by example, according to the process known from the U.S. Pat. No. 3,479,338.

As 6-(aminoacylamido)-penicillanic acid, the 6-(alpha-aminoacylamido)-penicillanic acids (in the form of their racemate, also in the optically active form), are especially worthy of consideration.

When in accordance with the invention, a silyl derivative of a carboxylic acid containing a beta-lactam ring of the aforesaid designated type is reacted with a solution of a compound of the formula $R_1$-O-Cat, which solution contains water- or alcohol in an amount insufficient for the desilylation of the silyl derivative of the carboxylic acid containing a beta-lactam ring, the desired salt of the carboxylic acid containing a beta-lactam ring are generally obtained as a solid. In the solution, there is present a mixture of trialkyl- or triarylsilanols (or disiloxanes), or dialkyl- or diarylsilandiols, or the silyl ester of the organic acid, or the silyl ether of the alcohol or phenol which was present in the alcoholate or phenolate. With regard to the course of the reaction, it is assumed that the amount of water present (for example) quantatively splits off the corresponding amount of the silyl-group (as is equivalent to the aforementioned amount of water) from the silyl derivative of the carboxylic acid containing the beta-lactam ring, and forms, for example, the disiloxane. Insofar as the carboxyl group of the beta-lactam ring-containing carboxylic acid is thereby also liberated, it is possible then to react it with the salt of the organic acid with liberation of the organic acid and formation of the salt of the beta-lactam ring-containing carboxylic acid. It is not yet entirely clear whether, thereafter the liberated carboxylic acid splits on its own accord whatever silyl derivatives of the beta-lactam ring-containing carboxylic acid which may still be present, and thereby converts itself into its silyl ester, or whether then, as in absolutely anhydrous or alcoholfree solution, a direct interaction takes place between the silyl derivative of the carboxylic acid containing the beta-lactam ring and the salt of the organic acid (or metal alcoholate). But this consideration does not affect the success of the reaction.

It is possible to describe this variant of the process of the invention, under consideration of the aforesaid explanations in the form of a reaction equation as follows. There is used as example, a trimethyl-silyl-ester of the beta-lactam ring-containing carboxylic acid which is reacted with an equimolar amount of the compound of the formula $R_1$-O-Cat and one-fourth of the amount of water which would be required for the complete desilylation of the silyl derivative of the beta-lactam ring-containing carboxylic acid. The reaction can be represented as follows

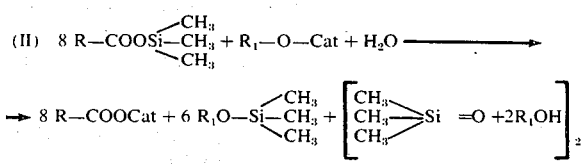

In the formula, R, $R_1$, and Cat have the same definition as stated above.

Typical compounds of the formula $R_1$-O-Cat are by way of example, the sodium-, potassium-, calcium-, magnesium-, triethylamine-, etc.- salts of carboxylic acids which contain with the exception of one or several carboxyl groups no other proton-active groups. Examples for such acids are butyric acid, isobutyric acid, alpha-ethylbutyric acid, isoamylethylacetic acid, dialkylmalonic acids (with a lower alkyl preferably), phenylacetic acid, or, especially, alpha-ethylhexanoic acid. While triethylamine has been mentioned, other alkyl amines are suitable too. Furthermore, the compounds of the formula $R_1$-O-Cat can be the potassiumor sodium salts of a lower aliphatic alcohol (as isopropanol, ter.butanol), of a phenol, or of a trialkyl-, (lower alkyl), especially of trimethylsilanol or of triphenylsilanol. Amongst the acids mentioned above fatty acids (as of 4 to 10 carbon atoms) form a desirable group and dialkyl (preferably lower alkyl) dicarboxylic acids like dimethyl malonic acid. Amongst the aliphatic dicarboxylic acids, malonic, succinic and glutaric have been considered, expecially the di-lower alkyl dicarboxylic acids.

The silyl derivative of the beta-lactam ring-containing carboxylic acids are readily soluble in anhydrous, aprotic solutions. Likewise, the by-products formed in the reaction are equally soluble as the silyl derivatives of beta-lactam ring-containing carboxylic acids in the various aprotic solvents and are, therefore, readily separable from the desired salts formed in the process, these salts being generally very difficultly soluble in aprotic solvents.

The fact that the process of the invention actually takes the course described in equation (I) could be demonstrated by reacting the trimethylsilyl ester of a penicillin with an anhydrous solution of the sodium salt of the alpha-ethylhexanoic acid in absolute ether. The solution of the sodium salt of alpha-hexanoic acid was obtained as completely anhydrous by adding somewhat more of N-methyl-N-trimethylsilylacetamide than the necessary equivalent to the amount of water contained in it as derived from its manufacture, and therewith converting the water into hexamethyldisiloxane. After the reaction is completed the sodium salt of penicillin was separated and the remaining solution was examined by gas chromatography. Thereby, it was seen that this solution contained the trimethylsilyl ester of alpha-ethylhexanoic acid, in addition to the N-methylacetamide and hexamethyldisiloxane, which came from the drying of the solution of sodium-ethylhexanoate, and a small amount of excess N-methyl-N-trimethylsilylacetamide.

The solution of the silylated carboxylic acid containing a beta-lactam ring should be as free as possible of salts which could have been formed in the manufacture of the silyl compound. By way of example, amine salts, such as triethylamino- or pyridine hydrochloride are noticably soluble in chlorinated hydrocarbons and other solvents. If necessary, it is possible to remove from the solution of the silyl derivatives of beta-lactam ring-containing carboxylic acids any undesirable salts contained therein, by treatment with suitable solvents, such as ether, petroleum ether, benzene, etc. in which these salts are insoluble but in which silyl derivatives are readily soluble. The salts can be removed by filtration. The obtained salt-free solution of the silyl derivative of the carboxylic acid containing the beta-lactam ring can them be employed for the reaction, according to the invention.

Typical solvents which can be used in the invention are those which are free of a proton active group and thus are inactive with respect to the silyl derivative which they cannot desilylate and cannot split off the cation in the formula $R_1$-O-Cat. Illustrative of such solvents are acyclic ethers, cyclic ethers, aliphatic saturated hydrocarbons, aromatic hydrocarbons, also halogenated hydrocarbons, esters of carboxylic acids, nitriles, amides, petroleum ethers and like solvents.

Typical ethers that can be used are the following: dialkyl ethers wherein the alkyl group may have for instance up to 6 carbon atoms such as di-isobutyl ether, methylisopropyl ether, methylisoamyl ether, n-propyl isopropyl ether, or such ethers as ethylene glycol dimethyl ether, ethylene glycol diethyl ether, propylene glycol dimethyl ether, methyl phenyl ether, tetrahydrofuran, or dioxane, or such saturated or halogenated or other aromatic hydrocarbons such as pentane, octane, petroleum ether, methylcyclohexane, decaline, methylene chloride, toluene, xylene, chloroform, tetrachloro hydrocarbons, or such esters of carboxylic acid as methylformate, ethylformate, ethylacetate, propyl acetate, isopropyl acetate, methoxyethylacetate, methoxyacidic acid ethyl ester, alpha-methoxy propionic acid ethyl ester, beta-acetoxy propionic methyl ester, benzoic methyl ester, tetrahydro benzoic ethyl ester; or other solvents as nitriles and amides such as acetonitrile, formamide, benzonitrile, N-methylformamide, dimethylformamide, acetamide, methoxy acidic acid dimethylamide, and such further solvents as dimethylsulfide, diethylsulfide, thiophene, and other such solvents.

The process of the invention is performed preferably at a temperature at which the reaction goes to completion within the time desired, for example between about the freezing point of the liquids, the solvent if one is used, to the boiling point of the reaction mixture. As an operative range −50°C to + 50°C, preferably −5°C to about + 35°C and preferably about 20 to 30°C, may be indicated.

According to the invention, the salt of a beta-lactam ring-containing carboxylic acid is suitable made as follows. A solution (A) of the carboxylic acid salt (or a solution, for example, of an alkali-isopropylate or tert. butylate, an alkaliphenolate or an alkalitrimethylor triphenylsilanolate) is mixed with agitation and excluding moisture with the (anhydrous and, as much as possible, also salt-free) solution (B) of an equivalent amount of the silylated carboxylic acid containing a beta-lactam ring. Solution A may be added to solution B, or vice-versa. Solution (A) should be anhydrous and alcohol-free or, contain at most an amount of water or alcohol insufficient to desilylate the silyl derivative of the beta-lactam ring-containing carboxylic acid present in solution B.

In accordance with the invention, the reactants are used in a substantially equimolar amount; if desired there may be used — although this is not necessary — an excess of the reactant $R_1$-O-Cat; for instance 1.0 to 1.1 is a satisfactory range. If desired the silyl derivative of the carboxylic acid may be used in excess.

The salt of the beta-lactam ring-containing carboxylic acid separates generally spontaneously. Filtration (under exclusion of air moisture) and rewashing with absolute ether yields the salt in a very high degree of purity, especially, if the process has used as starting material the monosilyl derivative of the beta-lactam ring-containing carboxylic acid in which the carboxyl group is silylated (esterified).

Should the silyl derivative of the beta-lactam ring-containing carboxylic acid contain more than one silyl group, it is recommended to use a solution A which contains an amount of water or alcohol insufficient for desilylation, and/or to carry out the rewashing with a solvent which was not extremely dry, whereby the disilylation of the silyl derivative of the beta-lactam ring-containing carboxylic acid, which is already precipitated as salt is completed by the small amount of water which then come into reaction.

The preparation of an absolutely anhydrous solution of a carboxylic acid salt of the formula $R_1O$-Cat may be carried out in such a way that a carboxylic acid as, for example, alpha-ethylhexanoic acid is dissolved in absolute tetrahydrofuran, an equivalent amount of a base (for example, solid sodium hydroxide or potassium hydroxide, calcium oxide, magnesium oxide, triethylamine, etc.) is added and, after the solid portion is dissolved, and anhydrous sodium sulfate is added in order to remove the greatest part of the water formed by the neutralization. The product is filtered and the water-containing drying agent is washed with tetrahydrofuran. This step can, of course, be omitted in the use of amines since no water forms during their neutralization. Upon concentration of the solution by evaporation, the residue is dissolved in a suitable aprotic solvent, respectively mixture of solvents. For example, there can be used a mixture made up of tetrahydrofuran/ether, in a ratio of 1:20, and the water content is then determined from an aliquot part of this solution. Finally, there is added an amount of the silylating agent equivalent to the water contant which has been determined, especially, trimethylsilylacetamide or N-methyl-N-trimethylsilylacetamide. The resulting solution can then be employed for the process, according to the invention, without having the acetamide, the N-methylacetamide as well as the hexamethyl-disiloxane from the drying step influence the reaction.

The salts of the invention are generally white solids, which are obtained or can be reduced to powdery form.

The success of the process of the invention, was not anticipated in view of the art for making salts of carboxylic acids which exist in the form of their silyl esters. It was necessary first to free the carboxyl group by hydrolysis or alcoholysis and only then the free carboxyl group could be converted into its salt in a manner known. One skilled in the art, therefore, had to recognize that particularly even in the presence of an amount of water or alcohol insufficient for desilylation, salt formation can at any rate be achieved only to the extent that the beta-lactam ring-containing carboxylic acid is liberated from its silyl ester. Surprisingly, however, the yields of salts of the beta-lactam ring-containing carboxylic acids in accordance with the invention are far higher than the maximum yields that can be expected in the light of the above.

The process according to the invention contributes significantly to the art. It provides the manufacture and isolation of salts of beta-lactam ring-containing carboxylic acids under notably mild conditions, whereby furthermore the salts are directly obtained in a dry form and, whereby, the risk of hydrolysis- or decomposition is avoided during the manufacture, isolation, and the removal of bound water of residue, which is a step necessary with the processes known. The salts of the process according to the invention are always obtained in a high degree of purity and yields. This is all the more surprising that according to the invention it is the first method (also independently from the field of the beta-lactam ring-containing carboxylic acids) in which a salt is made from the ester of a carboxylic acid without there taking place an intermediate saponification of the ester to the free acid.

The following non-limiting examples further illustrate the invention.

EXAMPLE 1

3.5 g of Penicillin V (free acid) was suspended in 30 ml of absolute ether and then 1.75 g N-methyl-N-trimethylsilylacetamide was added; a clear solution resulted. After one hour, this solution was poured into an anhydrous solution of 0.01 mole of a sodium salt of 2-ethyl-hexanoic acid in a mixture of 5 ml tetrahydrofuran and 35 ml ether (which had been made anhydrous by the addition of an amount of N-methyl-N-trimethylsilylacetamide, corresponding to the water content determined according to Karl-Fishcer method). Spontaneously, a precipitate is formed which consisted of the sodium salt of penicillin V. The precipitate was sucked off, excluding moisture and was washed with absolute ether. Thus there was obtained, after drying under vacuum, 3.8 g or 102% of theory of product, penicillin content was 97%, determined iodometrically.

EXAMPLE 2

4.32 g (0.02 mole) of 6-aminopenicillanic acid (APA) was suspended in 50 ml of absolute tetrahydrafuran and was converted to the disilyl derivative of 6-aminopenicillanic acid by the addition of 5.6 ml of triethylamine and 5.2 ml of trimethylchlorosilane. After the addition of another 2.8 ml of triethylamine, the reaction mixture was treated with 3.4 phenoxyacetic acid chloride. It is then allowed to react further for some time and the triethylamine hydrochloride is sucked off excluding moisture; the triethylamine hydrochloride is then washed 3 times, each with 30 ml of absolute tetrahydrofuran. The combined clear filtrates are concentrated under vacuum to a volume of about 50 ml yielding Solution I.

From 3.5 g of the sodium salt of 2-ethylhexanoic acid, 5 ml of absolute tetrahydrofuran, and 95 ml of absolute ether, a solution is prepared and a corresponding amount of N-methyl-N-trimethylsilylacetamide is added, the water content being determined according to the Karl-Fischer method. Thus, Solution II is obtained.

Solution I is combined with Solution II with good agitation, at which time the precipitation of the sodium salt of penicillin V begins immediately. After one hour it is sucked off, washed with ether, and dried in vacuum. The yield is 5.2 g or 80% of theory, by iodometrically determined assay the penicillin content is 96%.

Additional amounts of the product in a somewhat less pure form are obtained upon treatment of the mother liquor with ether, namely, 1.5 g by iodometrically determined assay the penicillin content is 91% of theory.

EXAMPLE 3 a. 5.1 g of APA was converted into the disilyl derivative in a solution of 50 ml anhydrous ethyl acetate, (free of alcohol and of acetic acid), in a known manner, by treatment with 6.5 ml triethylamine and 5.9 ml trimethylchlorosilane. The reaction mixture was treated with 2.8 ml of quinoline and, subsequently, with 4.6 g alpha-phenoxybutyric acid chloride. It was then further agitated for another hour, then filtered under strict exclusion of moisture, and the residue was washed 3 times, each with 15 ml of absolute acetic acid ethyl ester. The combined filtrates were concentrated by evaporation under vacuum to about 125 ml.

b. 0.02 Mole of the sodium salt of 2-ethylhexanoic acid is dissolved in a mixture of 5 ml of absolute tetrahydrofuran and 45 ml of absolute ether, and upon determination of the water content it is made anhydrous by addition of an equivalent amount of N-methyl-N-trimethylsilylacetamide. The resulting solution is added to the solution obtained in section (a) and is then treated under agitation with 220 ml of absolute petroleum ether. The reaction mixture is cooled and is allowed to stand for several hours. The precipitate is the sodium salt of 6-(alpha-phenoxybutyramido)-penicillanic acid. The product is sucked off, washed with ether, and dried in vacuum. The yield is 7.2 g or 90% of theory; the penicillin content determined iodometrically is 90% of theory.

EXAMPLE 4

A solution is prepared according to Example 3(a) and is treated with a solution of the potassium salt of 2-ethylhexanoic acid in tetrahydrofuran. This latter solution was prepared from 1.23 g of potassium hydroxide and 3.17 g of 2-ethylhexanoic acid in tetrahydrofuran and was made anhydrous after pre-drying with sodium sulfate, by treatment with N-methyl-N-trimethylsilyl-acetamide. The reaction mixture is treated under agitation with 200 ml absolute petroleum ether and is then cooled. The precipitate crystallized out upon standing, is sucked off, washed with ether, and dried in the vacuum. The resulting potassium salt of 6-(alphaphenoxybutyramide)-penicillanic acid is obtained in a yield of 7.8 g or 93.5% of theory. The penicillin content determined iodometrically is 97% of theory.

EXAMPLE 5

10.8 g. (0.05 mole of APA) is suspended in 80 ml absolute tetrahydrofuran and is converted, in known manner to the disilyl derivative of APA by treatment with 14 ml of triethylamine and 13 ml of trimethylchlorosilane. The deposited precipitate of triethylamino hydrochloride is removed by filtration under strict exclusion of moisture and washed twice, each with 40 ml of absolute tetrahydrofuran. The combined filtrates are concentrated to about 40 ml in the vacuum yielding Solution I.

A solution was prepared from 2.2 g of sodium hydroxide, 7.9 g of 2-ethylhexanoic acid, and 30 ml of absolute tetrahydrofuran, which was boiled down in vacuum subsequent to drying with anhydrous sodium sulfate. The residue was dissolved in a mixture of 10 ml tetrahydrofuran and 90 ml absolute ether. The water content was determined as 0.7 mg/ml, according to Karl-Fischer. For removal of the water the solution was treated with 1.45 g N-methyl-N-trimethylsilylacetamide and then combined with solution I. A precipitate occurred spontaneously and after 30 minutes it was sucked off under exclusion of moisture. The residue was washed with ether (undried, commercial) and then dried in vacuum. The sodium salt of APA was obtained in a yield of 12.1 g or 101% of the theory. APA content determined iodometrically was 89 %.

EXAMPLE 6

A solution of 0.005 mole of the silyl derivative of 7-(thienyl-2'-acetamido)-cephalosporanic acid in 50 ml absolute ether was treated portion-wise with a solution of 0.9 g of the sodium salt of 2-ethylhexanoic acid in a mixture of 1 ml of tetrahydrofuran and 20 ml of absolute ether, to which the amount of bis-trimethylsilylacetamide had been added which corresponded to any water traces to be removed. (The silyl derivative of the cephalosporanic acid used was obtained from a salt of the cephalosporin by treating with 0.5 ml of bis-trimethylsilylacetamide and 0.65 ml of trimethylchlorosilane and subsequent filtration.) The reaction mixture was cooled, then was sucked off after several hours under strict exclusion of moisture, and washed with absolute ether. Upon drying 1.4 g or 70 % of theory of the sodium salt of 7-(thienyl-2'-acetamido)-cephalosporanic acid was obtained which was proved to be identical with a sample of the authentic material.

EXAMPLE 7 a. 7 g of penicillin V (free acid) was treated with 2.07 g bis-trimethylsilylacetamide and then made up with absolute petroleum ether to a volume of 50 ml yielding Solution I.

b. 21,5 ml of a solution of 0.01 mole of the calcium salt of 2-ethylhexanoic acid (obtained by the reaction of calcium oxide with 2 mole 2-ethylhexanoic acid in absolute tetrahydrofuran and subsequent drying with sodium sulfate) is treated with 1 ml of N-methyl-N-trimethylsilylacetamide for removal of residual water. The resulting solution is added to Solution I whereby a precipitate came down spontaneously, which becomes crystalline when storing the reaction mixture under cooling. The precipitate is sucked off, washed with absolute ether, then with absolute petroleum ether, and finally dried in vacuum. The calcium salt of penicillin V is obtained in a yield of 7.7 g or 104 % of theory; iodometrically assay: 89 %.

EXAMPLE 8

200 ml of absolute tetrahydrofuran is poured over about 3 g of sodium wire and then a solution of 0.1 mole of phenol in 100 ml of absolute tetrahydrofuran is added dropwise under agitation. After the evolution of hydrogen ceases, the solution is filtered and concentrated by evaporation under vacuum. 2.32 g of the residue is dissolved in 10 ml absolute tetrahydrofuran and treated with 1 ml N-methyl-N-trimethylsilylacetamide. The resulting solution is added to a solution made according to Example 7(a) and the precipitate which is formed is sucked off after 2 hours. It is washed with absolute ether and dried in the vacuum. The resulting sodium salt of penicillin V is obtained in a yield of 7.0 g or 94 % of theory; penicillin content by iodometrically assay was 95 %.

EXAMPLE 9

200 ml of absolute tetrahydrofuran is poured over about 3 g sodium wire and a solution of 0.1 mole triphenylsilanol in 100 ml absolute tetrahydrofuran is then added dropwise. When hydrogen gas ceases forming the solution is filtered and the filtrate is concentrated to dryness by evaporation in vacuum. 7.2 g of the residue of sodium-triphenylsilanolate is dissolved in 25 ml absolute tetrahydrofuran and then 20 ml of absolute ether is added.

7 g penicillin V (free acid) is suspended in a mixture of 30 ml of absolute ether and 30 ml of absolute petroleum ether. A clear solution is obtained by the addition of 5 g N-methyl-N-trimethylsilylacetamide, which after one hour at room temperature is treated with the solution of sodium triphenylsilanolate. The spontaneous formation of a precipitate occurs which is sucked off, washed three times with 50 ml absolute ether and then is dried in vacuum at 60°C. The yield of penicillin V - sodium salt is 7.5 g or 100% of the theory; by iodometrically assay the penicillin content is 94%.

EXAMPLE 10 a. 21.6 g (0.10 mole) of APA is converted into the silyl derivative of APA in the presence of absolute tetrahydrofuran, with 0.2 mole of triethylamine and 0.2 mole of trimethylchlorosilane, as described in Example 2. The triethylamine hydrochloride formed is filtered off under strict exclusion of moisture and the filtrate is then made up to 500 ml with absolute tetrahydrofuran.

b. 100 ml of the solution obtained according to Example 10(a), is cooled to −5°C, is then treated with 2.8 ml triethylamine and thereafter slowly with 3.09 g of phenyl-acetyl chloride. The reaction mixture is subsequently agitated for one more hour and then the triethylamine hydrochloride formed is filtered off again in the absence of air moisture, yielding a filtrate designated as Solution I.

3.52 g of the sodium salt of 2-ethylhexanoic acid is dissolved in a mixture of 5 ml of absolute tetrahydrofuran and 35 ml of absolute ether, in a control experiment it had been ascertained that this solution still contains 12.5 mg water. The resulting solution was then added to Solution I and the mixture was allowed to stand 3 hours. The precipitate formed thereby was sucked off, washed 3 times, each with 50 ml ether, and dried in vacuum. The yield of penicillin G - sodium is 5.9 g or 83% of theory, with an iodometrically determined purity of 100%.

EXAMPLE 11

A solution is prepared by treating calcium oxide with 2 moles of ethylhexanoic acid in the presence of absolute tetrahydrofuran, which (after drying over anhydrous sodium sulfate and washing with absolute tetrahydrofuran) contains in 21.5 ml, 0.01 mole of the calcium salt of 2-ethylhexanoic acid (21.5 ml of this solution still contains 23 mg water).

21.5 ml of the solution prepared as aforesaid, is treated with 100 ml of a solution obtained according to Example 10(a). A precipitate appears spontaneously which is dried under suction after one hour, washed 3 times, each with 30 ml of ether, and then dried in vacuum. The calcium salt of APA is obtained in a yield of 4.9 g of 101.8% of theory, with an iodometrically determined purity of 92 %.

EXAMPLE 12

7 g of penicillin V (free acid) is treated with 2.07 g of bis-trimethylsilylacetamide and then with absolute petroleum ether until the resulting solution has a volume of 50 ml. This solution is then mixed with 21.5 ml of a solution of 0.01 mole of the calcium salt of ethylhexanoic acid, prepared as described in Example 11. A spontaneous formation of a precipitate occurs. The reaction mixture is allowed to stand for some time under cooling. The precipitate is then sucked off dry and after washing with absolute ether and absolute petroleum ether, it is dried in vacuum. The calcium salt of penicillin V is obtained in a yield of 7.5 g or 100% of theory, with an iodometrically determined purity of 92%.

EXAMPLE 13

A solution of 0.01 mole of the trimethylsilyl ester of 6-(alpha-phenoxybutyramido)-penicillanic acid is mixed with 10.8 ml of a solution of 0.005 mole of a calcium salt of 2-ethylhexanoic acid, dissolved in tetrahydrofuran, prepared as described in Example 11. The silyl ester is obtained by suspending the corresponding amount of the potassium salt of penicillin in 50 ml absolute ether, mixing it with 1 ml of N-methyl-N-trimethylsilylacetamide and 1.3 ml trimethylchlorosilane, and filtering under strict exclusion of air moisture after allowing to stand for 2 hours. A precipitate is formed spontaneously which is sucked off, washed with ether and dried in vacuum. The calcium salt of 6-(alpha-phenoxybutyramido)-penicillanic acid is obtained in a yield of 3.7 g or 93 % of theory, with an iodometrically determined purity of 96.5%.

EXAMPLE 14

A mixture of 6.5 g of APA, 75 ml of dry methylene chloride, and 4.1 ml of triethylamine is agitated at about 0°C for 30 minutes and then under agitation is slowly mixed with a solution of 1.83 ml of dichlorodimethylsilane in 15 ml of methylene chloride; the temperature is held below 20°C. The mixture is then agitated at room temperature for two more hours. The mixture is then treated with a solution of 4.2 ml triethylamine in 15 ml methylene chloride and is cooled to 10° – 15°C. At that temperature a solution of 5.6 g alpha-phenoxypropionyl chloride in 50 ml of methylene chloride is added dropwise and it is then agitated further for 90 minutes at 10° – 20°C. Upon the addition of 250 ml of dry petroleum ether it is agitated for 10 minutes more and is then filtered under anhydrous conditions. To this solution there is added a solution of 5.5 g potassium ethylhexanoate in 50 ml tetrahydrofuran is added (in a control experiment it has been ascertained that this solution still contained 0.316% water), whereby the precipitation of the potassium salt of penicillin began immediately. The latter was filtered off after some standing, washed with methylene chloride and then with ether, and dried in vacuum. The yield is 7.4 g or 61.5% of theory; the iodometrically determined penicillin content is 97.5%. From the filtrate an additional amount, 0.5 g or 4.2% of theory, of the penicillin salt accumulated upon mixing with ether.

EXAMPLE 15

6.5 g of APA is suspended in 65 ml of methylene chloride and mixed under agitation at 10°–15°C with 8.4 ml triethylamine and, subsequently, with 3.7 ml of dichlorodimethylsilane. The mixture, under agitation, is simmered for 2 hours under reflux, then cooled off and agitated for half an hour more at 5°–10°C. It is filtered under anhydrous conditions. The filtrate is treated with 4.2 ml of dry N,N-dimethylaniline and then, at 0°C, under agitation, slowly, with a solution of 5.5 g of alpha-phenoxypropionyl chloride in 15 ml of methylene chloride. It is allowed to reach room temperature and is agitated at this temperature for one more hour. It is then treated with 250 ml of dry petroleum ether and after agitation for 10 minutes, it is filtered under anhydrous conditions. The filtrate is treated with a solution of 5.5 g of potassium ethylhexanoate in 50 ml of tetrahydrofuran and the potassium salt of penicillin formed is filtered off after standing for two hours. After washing with methylene chloride and ether it is dried in vacuum. The yield is 9.2 g or 76.1% of theory, with an iodometrically determined purity of 91%.

EXAMPLE 16

Following the procedure of the above example, and using 6 g of alpha-phenoxy-butyryl chloride, there is obtained the potassium salt of 6-(alpha-phenoxybutyrylamido)-penicillanic acid in 82% yield of theory.

EXAMPLE 17

3.41 g of anhydrous (1-aminocyclohexyl-1)-penicillin is mixed with 1.75 g of N-methyl-N-trimethylsilylacetamide and heated to 40°–50°C under agitation till an almost clear solution results. Upon cooling to room temperature, it is mixed with 100 ml anhydrous and alcohol-free acetic acid ethyl ester and the solution formed is freed of the very small amounts of undissolved substance by filtration.

A solution prepared from 0.4 g of sodium hydroxide and 1.44 g of 2-ethylhexanoic acid in 20 ml of absolute tetrahydrofuran is concentrated by evaporation in vacuum. The residue is dissolved in a mixture of 5 ml of absolute tetrahydrofuran and 80 ml of absolute ether and the water content is then determined in an aliquot portion of this solution. According to the Karl Fischer method the content of the solution is 0.0081 mole of water. 1.5 g N-methyl-N-trimethylsilylacetamide is added for using up and binding the water so determined. After about 10 minutes, the first prepared solution of the silylated penicillin is quickly poured into the mixture obtained. The reaction mixture is kept at room temperature for two hours with occasional shaking. Thereby, the sodium salt of the penicillin used separates out of Solution. It is sucked off under exclusion of moisture and is washed 3 times, each with 50 ml absolute ether. Finally, it is dried in vacuum at 50°–60°C. The yield is 2.6 g or 72% of theory; the iodometrically determined penicillin is 94%.

EXAMPLE 18

The procedure of Example 17 is followed; however, the silyl derivative of 1-aminocyclohexyl-1-penicillin is dissolved in 100 ml absolute ether instead of acetic acid ethyl ester. In this manner, the sodium salt of penicillin is obtained in a yield of 3.2 g or 89% of theory, with an iodometrically determined penicillin of 83%.

EXAMPLE 19

A suspension of 34.1 g of 1-aminocyclohexyl-1-penicillin in 500 ml absolute tetrahydrofuran is mixed under anhydrous conditions with 28 ml of dry triethylamine and then slowly, with 26 ml of trimethylchlorosilane. The reaction mixture is stirred for several hours and the triethylamine hydrochloride formed is then removed by filtration under anhydrous conditions. The filtrate is concentrated to a volume of about 50 ml and is then treated with 500 ml absolute ether to give Solution I.

A solution is prepared from 4.4 g of sodium hydroxide and 15.8 g of 2-ethylhexanoic acid, dissolved in absolute tetrahydrofuran; it is then dried with sodium sulfate and concentrated by evaporation in vacuum. The residue yields after treatment with a mixture of 50 ml absolute tetrahydrofuran and 300 ml absolute ether, a solution which (according to a determination of its water content) contains 0.01 mole of water. Solution I is added to this solution and the reaction mixture is stored for 1 hour. The precipitate is sucked off, washed 2 times, each with 200 ml of ether, and then dried. Thus, the sodium salt of 1-aminocyclohexyl-1-penicillin is obtained in a yield of 37 g or 103% of theory, with an iodometrically determined penicillin content of 90%.

EXAMPLE 20

43.2 g of APA is reacted, following the procedure of Example 3 A of German Disclosure No. 1,800,698, in methylene chloride. to form the disilyl derivative of APA by treating with 56.5 ml of triethylamine, and 17 ml of pyridine (instead of the dimethylaniline used in the literature reference mentioned), and 51 ml of trimethylchlorosilane. The solution is then cooled and 39.7 g of the hydrochloride of 1-aminocyclohexane-1-carboxylic acid chloride are added portion-wise under good agitation; the temperature is kept at about 0°C. After stirring for two hours (during which the mixture is allowed to assume room temperature), 600 ml of petroleum ether (boiling range 50°–60°C) is added, and then the mixture is treated with 28 ml dry triethylamine. The mixture is stirred some more time, and it is then filtered under anhydrous conditions. The residue is washed with petroleum ether and thereafter the combined filtrates are separated from the main amount of methylene chloride in vacuum. Thus, a solution of the silylated 1-aminocyclohexyl-1-penicillin is obtained yielding Solution I.

A solution of 34 g of the sodium salt of 2-ethylhexanoic acid in 200 ml of absolute tetrahydrofuran and 100 ml absolute petroleum ether (which was prepared as in the preceding examples and contains a total of 574 g of water) is treated with Solution I under agitation. After 2 hours the precipitate is sucked off dry and washed with ether. After drying at 80°C in vacuum, the sodium salt of 1-aminocyclohexyl-1-penicillin is thus obtained in a yield of 73.8 g or 101.8% of theory, with an iodometrically determined penicillin content of 84%.

EXAMPLE 21

3.5 g of D(-)-alpha-aminobenzyl-penicillin are dissolved in 1.75 g of N-methyl-N-trimethylsilylacetamide under agitation and heating to 40°–50°C. The solution is cooled to room temperature and treated with 50 ml of absolute acetic acid ethyl ester. The clear solution obtained is treated with a dry solution of 1.7 g of the sodium salt of 2-ethylhexanoic acid in acetic acid ethyl ester (which has been made anhydrous by the addition of N-methyl-N-trimethylsilylacetamide). After some time the precipitate is sucked off, washed with absolute ether, and dried in vacuum. The sodium salt of D(-)-alpha-aminobenzylpenicillin is obtained in a yield of 3.7 g or 100.9% of theory, with an iodometrically determined penicillin content of 92%.

EXAMPLE 22

7 g of D(-)-alpha-aminobenzylpenicillin are reacted with 3.5 g of N-methyl-N-trimethylsilylacetamide, as in Example 21, and the product obtained is then dissolved in 100 ml of absolute ether. This solution is added to a dry solution of 0.02 mole of the potassium salt of 2-ethylhexanoic acid in 25 ml absolute tetrahydrofuran. After one hour the precipitate is sucked off, washed with absolute ether, and dried in vacuum. Thus, the potassium salt of D(-)-alpha-aminobenzylpenicillin is obtained in a yield of 7.8 g and with an iodometrically determined penicillin content of 90 % of theory.

EXAMPLE 23

3.41 g of 1-aminocyclohexyl-1-penicillin is treated with 1.75 g of N-methyl-N-trimethylsilylacetamide under agitation and heating to 40° – 50°C. After cooling to room temperature it is treated with 100 ml absolute ether whereby a clear solution designated Solution I, forms.

An anhydrous solution of 0.005 mole of the calcium salt of 2-ethylhexanoic acid in 10 ml of tetrahydrofuran is treated with Solution I, under agitation. A precipitate occurs spontaneously. After half an hour it is sucked off and washed 3 times, each with 30 ml of ether. The above solution of the calcium salt is obtained by reacting calcium oxide with 2 mole of 2-ethylhexanoic acid in tetrahydrofuran and removing the water contained in the solution by the addition of N-methyl-N-trimethylsilylacetamide. The calcium salt of penicillin so obtained has an iodometrically determined purity of 97.6%. The yield is 3.6 g or 99.3%.

EXAMPLES 24 – 34

In the examples listed below the compound represented by $R_1$-O-Cat in that example as described above there is substituted the below-named reactant.

| Examples | | Reactant |
|---|---|---|
| 24 | 1 | sodium salt of butyric acid |
| 25 | 2 | sodium salt of dimethyl malonic acid |
| 26 | 6 | sodium salt of phenyl acetic acid |
| 27 | 8 | calcium salt of alpha-ethyl butyric acid |
| 28 | 11 | sodium salt of isoamyl ethyl acetic acid |
| 29 | 12 | sodium salt of isopropanol |
| 30 | 15 | potassium salt of amyl alcohol |
| 31 | 17 | sodium salt of tert. butanol |
| 32 | 19 | sodium salt of ethanol |
| 33 | 20 | sodium salt of trimethyl silanol |
| 34 | 22 | potassium salt of amyl alcohol |

The same salt product as described above in the respective examples is obtained.

We claim:

1. In the process for preparing a sodium, potassium or calcium salt of a penicillin, a cephalosporin, a 6-amino-penicillanic acid, wherein there is reacted a silyl derivative of the penicillin, the cephalosporin, or the 6-aminopenicillanic acid in which derivative at least the carboxyl group is linked, through the silicium atom, to a trimethylsilyl or a dimethylsilyl group, the improvement which comprises using as a reactant a salt which is a member of the group consisting of a sodium, a potassium or a calcium salt of 2-ethylhexanoic acid, butyric acid, alpha-ethyl-butyric acid, isobutyric acid, dimethylmalonic acid, isoamyl ethyl acetic acid phenyl acetic acid, ethanol, of a propanol, a butanol, an amylalcohol, of phenol, trimethylsilanol or of triphenylsilanol, and forming said salt directly from said silyl derivative, without intermediate saponification of the ester to the free acid.

2. In the process of claim 1 for preparing a sodium, potassium or calcium salt of a penicillin, selected from the group consisting of alpha-phenoxy-acetyl-, alpha-phenoxypropionyl-, alpha-phenoxybutyryl-, phenylacetyl-, alpha-amino phenyl acetyl-, 1-amino-cyclohexan-1-carbonyl-, alpha-aminothienylacetyl-, alpha-guanylureido-phenylacetyl- and alphacarboxy-thienylacetyl-6-amino-penicillanic acid, where there is reacted under anhydrous conditions, a silyl derivative of said penicillin in which derivative at least the carboxyl group is linked through the silicium atom to a trimethylsilyl or a dimethylsilyl group, the improvement which comprises using as a reactant a salt which is a member of the group consisting of a sodium, a potassium or a calcium salt of 2-ethylhexanoic acid, butyric acid, alpha-ethyl-butyric acid, isobutyric acid, dimethylmalonic acid, isoamyl ethyl acetic acid phenyl acetic acid, ethanol, of a propanol, a butanol, an amylalcohol, of phenol, trimethylsilanol or of triphenylsilanol and forming said penicillin salt directly from said silyl derivative.

3. The process of claim 1 wherein the silyl derivative is a penicillin.

4. The process of claim 1 wherein the silyl derivative of the beta-lactam ring-containing carboxylic acid is a compound of the formula $$\begin{array}{c} Z \\ | \\ X-N-CH- \\ | \\ O=C \end{array} \begin{array}{c} S \\ \diagdown \diagup \\ \diagup \diagdown \\ N \end{array} \begin{array}{c} CH_3 \\ \diagdown \\ CH_3 \\ \diagup \\ COOY \end{array}$$

wherein X is an acyl residue of a carboxylic acid of an alpha-amino, alpha-halogeno, or of an alpha-loweralkoxy-phenylacetic acid, of a 3-(or 5-)aryl-5-(or 3-)alkyl-isoxazolyl-4-carboxylic acid, or of a 1-amino-cyclohexane-1-carboxylic acid, Y is a group derived from a tri-loweralkyl- or triphenyl silanol, or from a di-loweralkyl- or diphenyl silanol, wherein the lower alkyl is of 1 to 4 carbon atoms and is linked with a silicium atom, and Z is hydrogen or has the same definition as Y.

5. The process of claim 4 wherein the silyl derivative of the beta-lactam ring-containing carboxylic acid is a compound in which at least the carboxyl group is linked with a group of the formula $$-Si \begin{array}{c} \diagup R_2 \\ -R_3 \\ \diagdown R_4 \end{array}$$

wherein $R_2$, $R_3$, $R_4$ is lower alkyl or phenyl.

6. The process of claim 1 wherein the compound $R_1$-O-Cat is an alkali - or an alkaline earth salt of a fatty acid or of a di(lower alkyl)malonic acid.

7. The process of claim 1 wherein the reaction solution comprises a silylating reactant in an amount at least equivalent to the water or hydroxyl content of said solution.

8. The process of claim 7 wherein the silylating reactant is added prior to the reaction with the silyl derivative of the penicillin, cephalosporin or the 6-aminopenicillanic acid.

9. The process of claim 1 wherein the reaction is carried out in the presence of an acyclic or cyclic ether, a saturated halogenated hydrocarbon, an aromatic hydrocarbon or an ester of a carboxylic acid solvent.

10. The process of claim 1 wherein the solution of the silyl derivative which is reacted is salt free.

11. The process of claim 10 which comprises preparing, prior to the reaction with the salt reactant, the salt-free solution of the silyl derivative by treating a salt-containing solution of the silylated penicillin, cephalosporin or the 6-aminopenicillanic acid with a solvent for the silyl derivatives which is not a solvent for the salts, and removing the salts.

12. The process of claim 1 wherein the silyl derivative has a plurality of silyl groups and the reactant solution contains an amount of water or hydroxyl-containing solvent insufficient to desilylate the silyl compound.

13. The process of claim 1 wherein the silyl derivative product is washed with a solvent which contains an amount of water or hydroxyl-containing solvent insufficient to complete the desilylation of the precipitated silyl salt derivative.

14. The process of claim 1 which comprises treating, prior to the reaction with the salt reactant, a silyl derivative of a 6-(aminoacylamido)-penicillanic acid having a salt-like amino group to convert said amino group to give the free and/or the silated compound.

15. The process of claim 1 which is carried out in the presence of an amount of water or other hydroxyl-containing solvent up to that insufficient to desilylate the silyl derivative of the carboxylic acid.

16. The process of claim 6 wherein the salt is a salt of alpha-ethylhexanoic acid.

17. The process of claim 7 in which the silylaing reactant is N-methyl-N-trimethyl silylacetamide or trimethyl silylacetamide.

18. The process of claim 12 wherein the silyl derivative of the 6-(aminoacylamido)-penicillanic acid is derived from alpha-aminobenzyl-penicillin or from (1-aminocyclohexyl-1)-penicillin.

19. The process of claim 4 wherein the aryl in 3-(or 5-)aryl-5-(or 3-)alkylisoxazolyl-4-carboxylic acid is phenyl or loweralkyl phenyl.

20. The process of claim 4 wherein the two reactants are brought together at a temperature in the range between the freezing point to the boiling point of the reaction mixture.

21. The process of claim 20 wherein the temperature is −50° to 50°C.

22. The process of claim 21 wherein the temperature is in the range of −5° to about 35°C.

23. The process of claim 22 wherein the temperature is in the range of about 20° to 30°C.

24. The process of claim 4 wherein the two reactants are used in substantially equimolar amount.

25. The process of claim 4 wherein the salt reactant is used in an amount in the range of about 1 to 1.1.

26. The process of claim 4 wherein the salt which is formed is isolated thereafter from the reaction mixture.

27. The process for preparing a salt of a penicillin which comprises bringing together and reacting, in the presence of an aprotonic organic solvent a silyl derivative of a penicillin of the formula $$\begin{array}{c} Z \\ | \\ X-N-CH-CH \\ | \\ O=C \end{array} \begin{array}{c} S \\ \diagdown \diagup \\ \diagup \diagdown \\ N \end{array} \begin{array}{c} CH_3 \\ \diagdown \\ C-CH_3 \\ \diagup \\ CH-COOY \end{array}$$

wherein X is an acyl residue of a carboxylic acid, Y is a group derived from a tri-loweralkyl- or triphenyl silanol, or from a di-loweralkyl- or diphenyl silanol and is linked with a silicium atom, and Z is hydrogen or has the same definition as Y, with a compound of the formula $$R_1 - O - Cat$$

wherein $R_1$ is an acyl residue derived from a carboxylic acid which is free of protonic groups, or an alkyl, an aryl residue or a group of the formula $$-Si \begin{array}{c} \diagup R_2 \\ -R_3 \\ \diagdown R_4 \end{array}$$

wherein $R_2$ to $R_4$ is alkyl or aryl and wherein Cat is a cation, and forming said salt directly from said silyl derivative.

28. The process of claim 27 wherein X is the acyl residue of an alpha-amino, alpha-halogeno, or of an alphaloweralkylphenoxy acetic acid, of a 3-aryl-5-alkyl-isoxazolyl-4-carboxylic acid, or of a 1-amino-cyclohexane-1-carboxylic acid.

29. In the process for preparing a salt of a carboxylic acid containing a beta-lactam ring wherein the silyl derivative is a compound of the formula

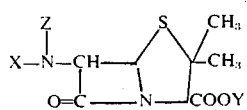

wherein X is an acyl residue of a carboxylic acid of up to 4 carbon atoms; of an alpha-amino, alpha-halogeno, or of an alpha-lower-alkoxy-phenylacetic acid, of a 3-(or 5-) aryl-5-(or 3-) alkyl-isoxazolyl-4-carboxylic acid, or of a 1-aminocyclohexane-1-carboxylic acid, Y is a group derived from a tri-lower-alkyl- or triphenyl-silanol, or from a di-loweralkyl - or di-phenylsilandiol linked through a silicium atom, and Z is hydrogen or has the same definition as Y, the improvement in the process which comprises using as a reactant a compound of the formula $R_1$-O-Cat wherein $R_1$ is an acyl residue derived from a lower carboxylic acid, a lower alkyl, a phenyl group or a group of the formula

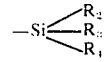

wherein $R_2$ to $R_4$ is lower alkyl or phenyl and wherein Cat is calcium, potassium or sodium, and forming the salt directly from said silyl derivative without intermediate saponification of the ester to the free acid.

* * * * *